Figure 6:
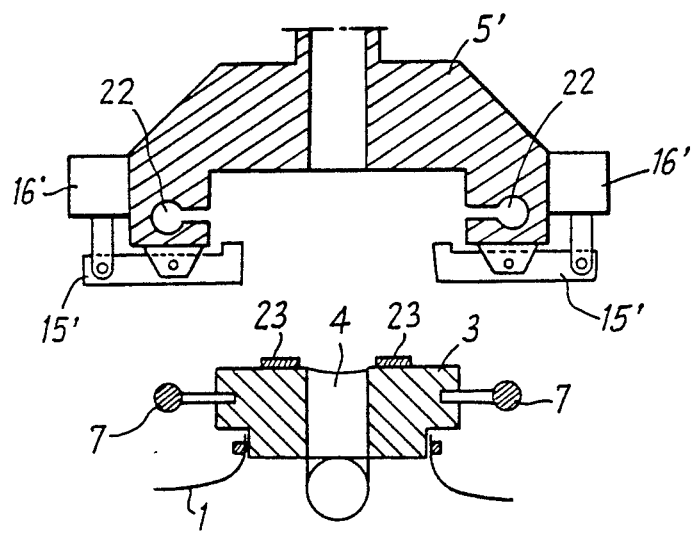

United States Patent [19]

Rocher et al.

[11] Patent Number: 4,842,445
[45] Date of Patent: Jun. 27, 1989

[54] COVERING STRUCTURE INTENDED ESPECIALLY TO BE PLACED ON A CONDUIT OR THE LIKE LAID ON THE OCEAN FLOOR

[75] Inventors: Xavier Rocher, Paris; Bruno Faure, Suresnes; Lucien Legallais, Orgeval, all of France

[73] Assignee: Coflexip, Paris, France

[21] Appl. No.: 78,627

[22] Filed: Jul. 28, 1987

[30] Foreign Application Priority Data

Jul. 30, 1986 [FR] France ............... 86 11036

[51] Int. Cl.⁴ .................................... F16L 1/04
[52] U.S. Cl. .................... 405/172; 405/158; 405/17
[58] Field of Search ............. 405/172, 158, 17, 159, 405/222, 223

[56] References Cited

U.S. PATENT DOCUMENTS

| 687,389 | 11/1901 | Wilhelmi | 405/172 X |
|---|---|---|---|
| 3,779,027 | 0/1973 | Murphy | 405/172 |
| 3,793,845 | 0/1974 | Keith | 405/172 |
| 4,242,010 | 12/1980 | Gjerde et al. | 405/172 X |
| 4,477,206 | 10/1984 | Papetti et al. | 405/172 |
| 4,480,943 | 11/1984 | Levenberger | 405/172 |

FOREIGN PATENT DOCUMENTS

| 0091531 | 10/1983 | European Pat. Off. | |
| 2836189 | 2/1979 | Fed. Rep. of Germany | |
| 2369387 | 5/1978 | France | 405/172 |
| 7804372 | 10/1979 | Netherlands | 405/172 |

OTHER PUBLICATIONS

French Search Report No. FR 86 11 036 Dated 1987.

*Primary Examiner*—Dennis L. Taylor
*Attorney, Agent, or Firm*—Hoffman, Wasson, Fallow & Gitler

[57] ABSTRACT

The invention relates to a structure for covering of submarine elements of elongated shape, in particular conduits laid on the ocean floor.

It comprises at least one closed flattened tubular element (1), the element or each of the elements comprising at least one orifice (4) for injection of a hardenable material, particularly cement.

9 Claims, 5 Drawing Sheets

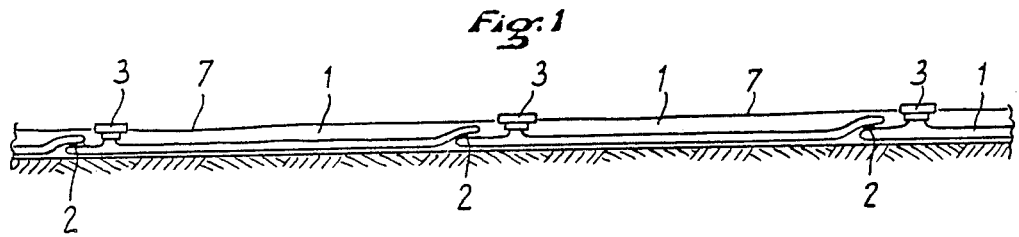
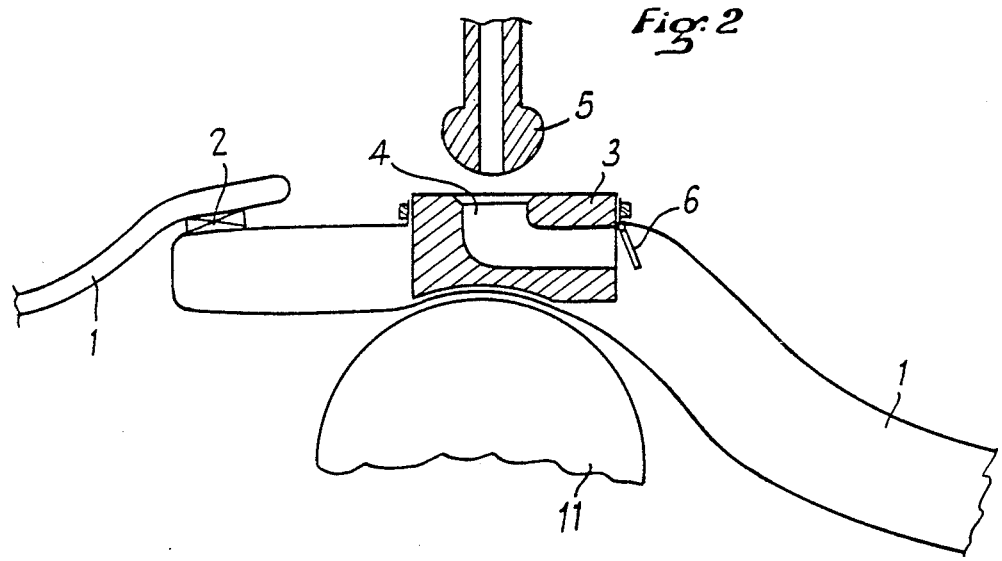
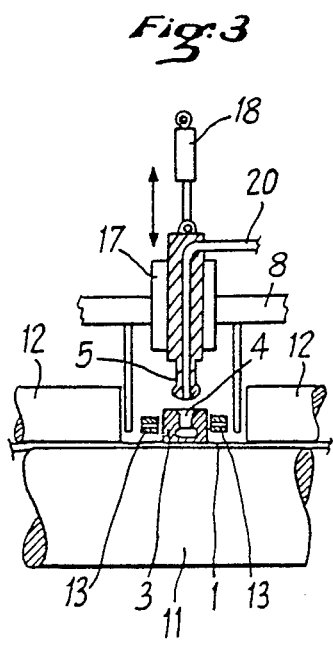
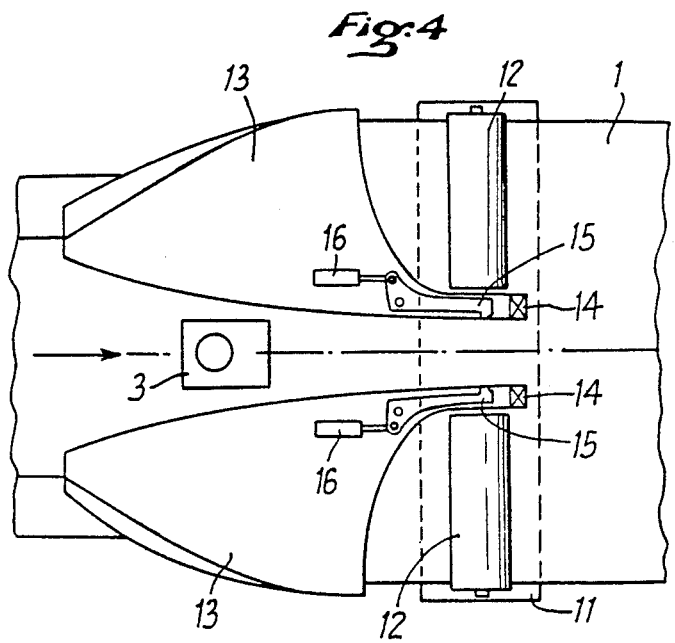

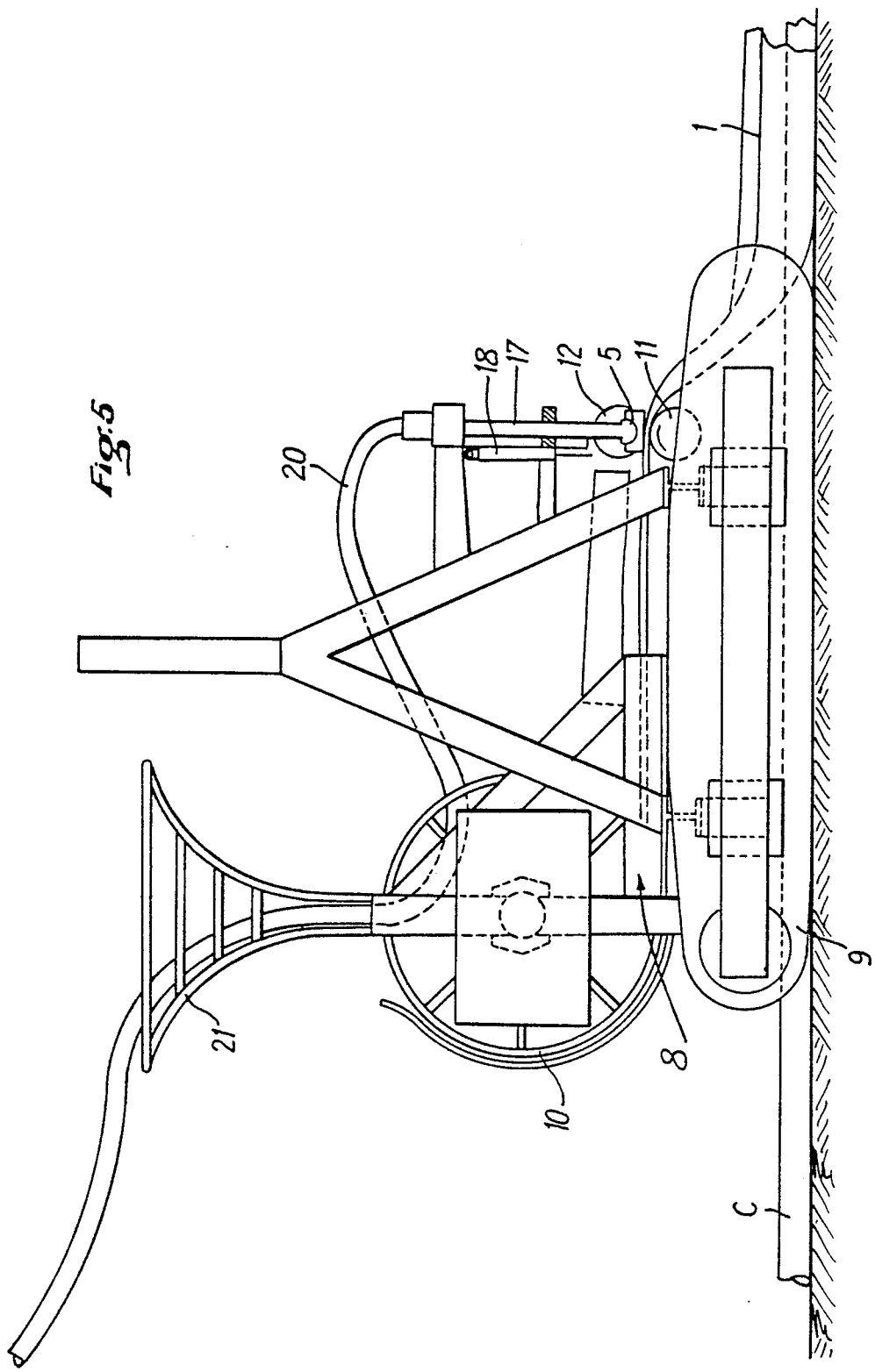

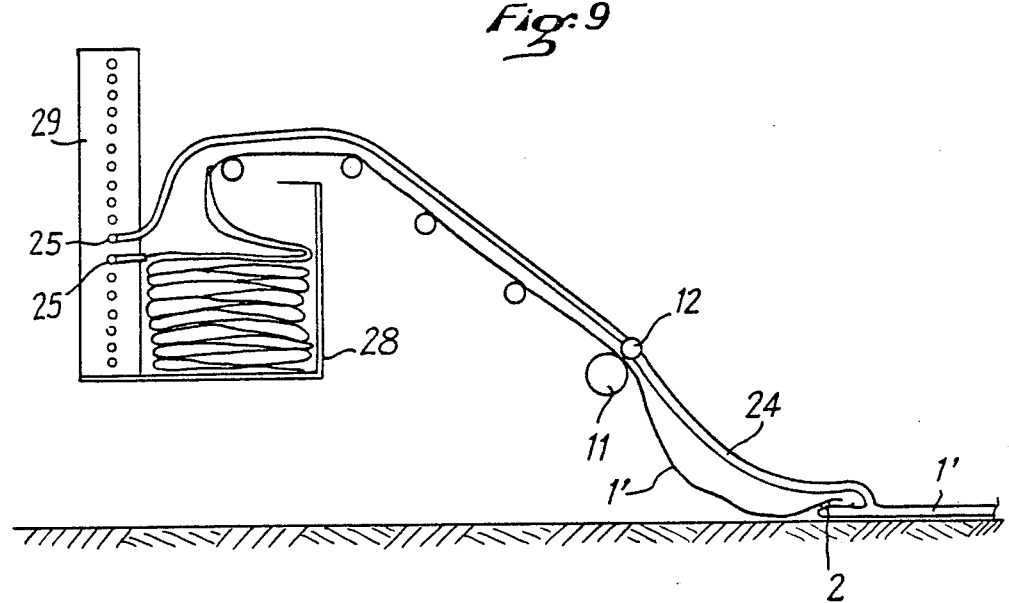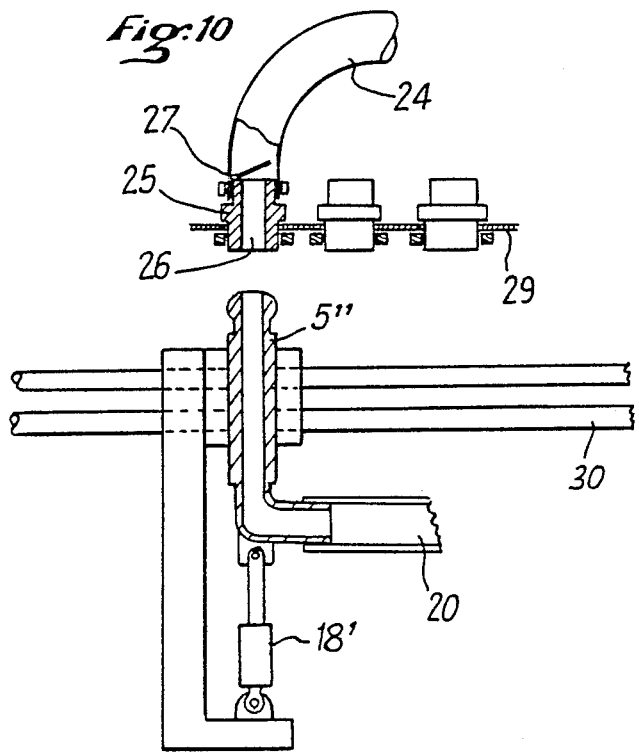

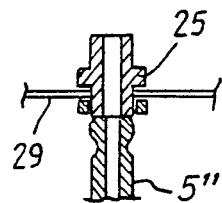
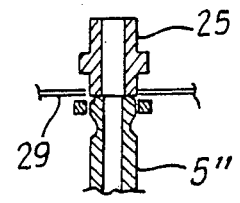
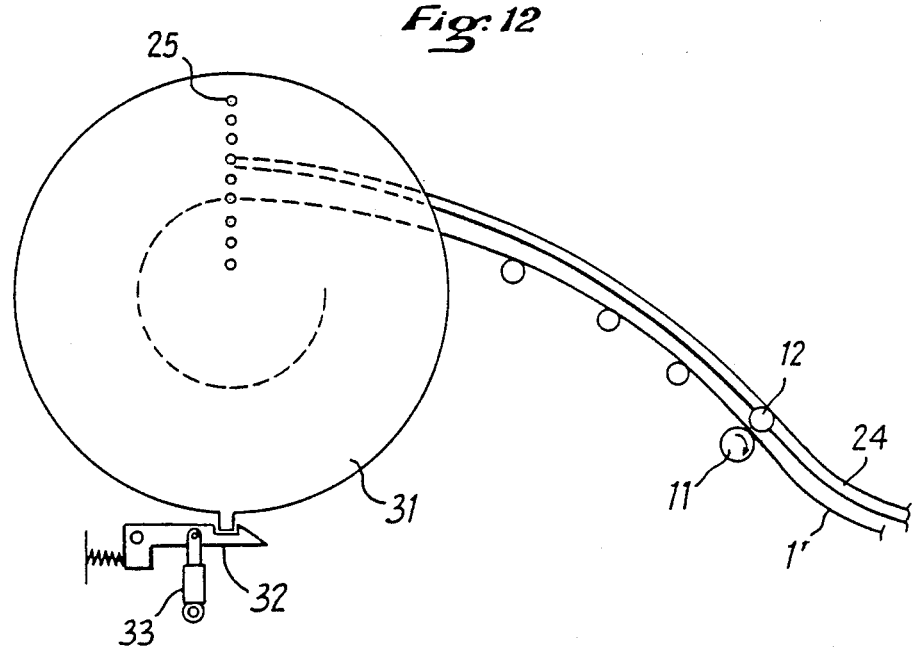

COVERING STRUCTURE INTENDED ESPECIALLY TO BE PLACED ON A CONDUIT OR THE LIKE LAID ON THE OCEAN FLOOR

This invention relates to a covering structure intended to be placed especially on submarine elements of elongated shape, in particular on a conduit or the like placed on the ocean floor.

This invention also relates to a device making possible the placing of such a structure.

It has been known for a long time and described, for example, in British patent 1 585 170 how to place on conduits placed on the ocean floor sacks that are filled with a hardenable material, such as cement, to immobilize the conduits as much as possible on the ocean floor.

Such a process requires the intervention of divers, particularly for connecting and disconnecting the cement injection conduits.

Moreover, a process is known by U.S. Pat. No. 4 480 943 making it possible continuously to cover, as a rule without the help of divers, a conduit or the like placed on the ocean floor by using a sheet whose longitudinal ends are folded and joined by a continuous closing device such as a zipper, the folded sheet being filled with an injectable material such as cement then placed continuously on the conduit to be covered.

Experience shows that difficulties can easily appear in using such a process, particularly because of the jamming which can occur in the closing device, then requiring the intervention of divers to reestablish the normal operating cycle, which goes against the object sought.

This invention is proposed to provide a structure and a placing device while avoiding the drawbacks of the prior systems, all the placing phases being able to be performed without intervention of divers and therefore at any laying depths.

The structure according to the invention is characterized in that it comprises at least one closed flattened tubular element, and preferably a plurality of closed flattened tubular elements, placed in succession by being joined to one another by connecting means, preferably with controlled breaking stress, the various elements overlapping partially near their longitudinal ends and the element or each of the elements comprising at least one orifice for injection of a hardenable material, particularly cement. In the case of a single element, a plurality of injection orifices is provided, preferably distributed uniformly over the length of the element.

Because of its configuration, the structure according to the invention can be stored either on a drum or folded like an accordion in a container provided for this purpose.

In a first embodiment of a structure with several elements, each of the tubular elements exhibits near one of its longitudinal ends, in one of its faces, an injection orifice made with a plate fastened to the element in its upper part, designed to work with the injection head, said plate comprising a check valve. In an advantageous embodiment there is provided a second injection orifice made in the same way close to the other longitudinal end of the element.

In the case of a structure with a single element, a plurality of injection orifices is provided, made as indicated above.

Preferably, a pair of longitudinal guide cables are provided connecting the successive injection plates to one another.

In a second embodiment of the structure with several elements according to the invention, the element or each of the elements is solid with at least one pipe provided on its end with a tip comprising an injection orifice and preferably equipped with a check valve.

In the case of a structure with a single element, a plurality of injection orifices is provided, made as indicated above.

In this embodiment, the various tips are placed preferably in a row on or close to the storage element of the structure.

The element or elements of the structure according to the invention can further be provided with lateral weighting elements, for example, lead ballast placed along each longitudinal edge of the structure.

The device according to the invention for placing of the structure comprises, on a mobile frame on the ocean floor, a drive element, particularly a drive drum to drive the structure from a storage element such as a container or drum also mounted on the frame of the device, at least one injector fed by a supply line of hardenable material, particularly cement, and able to work with each of the injection orifices of the structure for filling of the latter, means being provided to make the injector solid with the injection orifice during the filling phase.

The device according to the invention is used by moving the mobile frame along the submarine element to be covered, the structure according to the invention being progressively unrolled from the storage element and placed as covering of the submarine element. Filling of the structure is done in a discontinuous manner progressively, by a succession of elementary operations, the mobile frame being immobilized for each injection during the time necessary to assure the connection of the supply line with the injection orifice and to deliver the appropriate amount of hardening material.

In a first embodiment for placing the structure in which each tubular element comprises at least one injection plate, means for guiding and positioning of each of the injection plates opposite the injector are provided on the device.

The injector can be stationary or mobile back and forth approximately perpendicular to the direction of the movement of the structure.

In a second embodiment in which on each of the elements of the structure at least one pipe is provided equipped with an injection tip, the various tips being mounted in alignment on a support structure, the injector is advantageously mounted on a mobile carriage on guides along said row so as to be brought opposite each of the successive aligned tips, said injector further being driven in an axial advance movement making it possible, after filling of an element, to eject from its support the corresponding tip.

Figure 7:
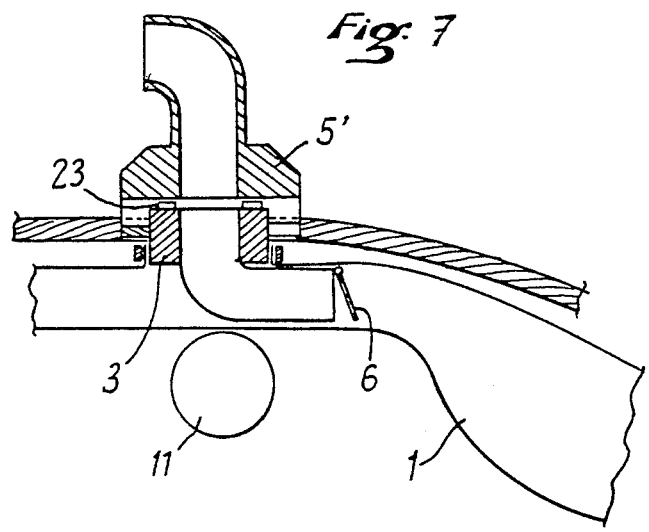
Figure 8:
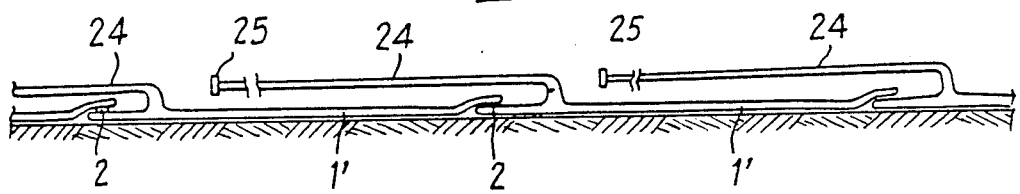

Other advantages and characteristics of the invention will come out from reading of the following description of examples of embodiments, in no way limiting, with reference to the accompanying drawing in which:

FIG. 1 is a diagrammatic representation in elevation of a covering structure according to a first embodiment of the invention, FIG. 2 is a diagrammatic view partially in section showing the arrangement of the elements of the structure, the injector being positioned to come in contact with the injection plate for the filling, FIG. 3 is a diagrammatic view in front elevation and in section of the injection station of the device according to a first embodiment of the invention, FIG. 4 is a top view showing the arrival of an element to be filled at the injection station, the injector not being shown, for greater clarity, FIG. 5 is a view in diagrammatic lateral elevation of a device according to the invention, FIGS. 6 and 7 are views in diagrammatic perspective illustrating the position of an element to be filled opposite the injection device according to a second embodiment, FIG. 8 is a view similar to FIG. 1 of a second embodiment of the covering structure according to the invention, FIG. 9 illustrates the progress of the structure according to FIG. 8 in a first embodiment, FIG. 10 illustrates diagrammatically an injector that can be used to fill the structure represented in FIGS. 8 and 9, FIGS. 11a and 11b are views in section corresponding to FIG. 10 showing two different relative positions of the injector in relation to a tip of the pipe end of an element of the structure and, FIG. 12 is a view similar to FIG. 9 according to a variant embodiment where the progress of the structure takes place from a drum.

Reference is made first to FIGS. 1 and 2. The structure according to the invention comprises a plurality of flattened tubular elements 1, made, for example, of permeable or impermeable fabric, each of the tubular elements being able to have, for example, a length between 2 m and 30 m and a width between 0.5 and 4 m, when filled with hardenable materials.

The various tubular elements 1 are arranged in a string and are joined to one another close to their ends by fasteners 2 with controlled breaking load, for example straps connected by sewing with a yarn with known breaking load.

As can be seen in FIGS. 1 and 2, between successive elements 1, in the form of bags, a covering is made which can reach, for example, a length of 0.5 m.

For them to be filled with hardenable fluid material, particularly cement, each of tubular elements 1 comprises close to its back part an injection plate 3 defining an injection orifice 4 on which the head of an injector 5 can come to engage as will be described below.

According to the invention, a device is provided intended to prevent a backflow of the injected cement through injection orifice 4, for example, a check valve 6. Plates 3 of various elements 1 can be joined by parallel guide cables 7 placed on both sides of the plates. This embodiment is intended to work with the device of FIGS. 6 and 7.

Reference is now made more particularly to FIGS. 3 to 5 which illustrate a first embodiment of the device according to the invention.

As can be seen in FIG. 5, the device intended to lay the covering structure of a conduit C comprises a frame 8 mobile on the ocean floor by being mounted on caterpillars 9, and being controlled from a surface ship and receiving from the surface ship all the hydraulic and electric fluids necessary for its operation.

Cameras (not shown) can be mounted on the frame of the device to allow command and checking from the surface of all the phases of using the device.

In the embodiment represented, the structure made up of joined tubular elements 1 is stored wound on a drum 10. In a variant not shown, a storage container in which the various elements of the structure are folded like an accordion can be involved.

The device comprises at the end of the frame opposite that carrying drum 10 an injection station comprising, for driving of elements 1, a motorized driving drum 11 with a horizontal axis above which are placed support rollers 12.

For precise guiding and positioning of an injection plate 3 opposite injection head 5, there are provided in the embodiment shown centering guides 13 (FIGS. 3 and 4) placed on both sides of the path of movement of injection plates 3. To detect the position of the injection plate opposite head of injector 5, sensors 14 are provided whose output signal triggers the actuation of a bolt 15 for locking the plate in position.

Each of the bolts is associated for this purpose with an actuating device such as a cylinder mechanism 16.

Head of injector 5 is carried at the end of an injection tube 17 vertically mobile back and forth, as represented by the arrow in FIG. 3 under the action of an actuation element such as a cylinder 18.

An intake hose 20 of the injectable product, especially cement, supplies the injector and comes to the device from the surface, being guided in a guide structure in the shape of a trumpet 21.

For filling of each element 1 of the structure, corresponding plate 3 is brought opposite the injector head which then comes to cover the injection orifice and a metered amount of cement is injected into the element, a sensor, for example a mechanical one (not shown) making it possible to check to see if the element is suitably filled. Then frame 8 is made to advance while unrolling the tubular structure until plate 3 of the next element is brought opposite the injector head.

In the variant embodiment shown in FIGS. 6 and 7, injector 5' is stationary, guiding of injection plate 3, which laterally carries guide cables 7, being assured by engagement of said cables in longitudinal guide cavities 22, made in the inside wall of the injector. Injection plate 3 comprises seals 23 in the support zone of injector 5'.

Also in this embodiment, bolts 15', controlled by actuating mechanisms 16', are provided to immobilize injection plate 3 opposite the cement intake orifice and to assure sealing of joints 23 by pressing plate 3 against the support zone of injector 5'.

Reference is now made to FIGS. 8 to 12 which illustrate another embodiment in which the structure intended to cover a conduit or a bundle of conduits placed on the ocean floor is made up of tubular elements 1', placed in a string with a covering between the successive elements and fasteners 2 between the various elements similar to those of the embodiment of FIG. 1.

In this embodiment, each of elements 1' is not provided directly with an injection plate but is extended by a pipe 24 provided on its end with a tip 25 comprising an injection orifice 26 and a check valve 27 as can best be seen in FIG. 10.

In a first embodiment illustrated in FIG. 9, the various elements 1' are stored in a container 28 by being folded like an accordion, the various tips being fastened in alignment on a holding plate 29 opposite which an injector 5" can move on guides 30 provided for this purpose, the injector being able to move longitudinally back and forth by an actuating mechanism 18'.

The injector is supplied with cement by a flexible conduit 20 connected to the surface.

As can be seen in FIG. 11a, to achieve the injection, the head of injector 5" is brought into contact with tip 25 held in plate 29.

After injection of a metered amount of cement, the head of injector 5" is made to advance by actuation of mechanism 18' (FIG. 10) until tip 25 is freed from plate 29 as shown in FIG. 11b.

The injector is then moved opposite tip 25 corresponding to element 1' then to be filled.

The embodiment illustrated in FIG. 12 differs from that of FIG. 9 by the fact that the various elements are stored on a drum 31, various tips 25 extending pipe 24 being fastened in a row arranged according to the radius of storage drum 31.

A locking bolt 32 is provided to immobilize the drum in the injection position, this bolt being released under the action of an actuating mechanism 33.

When the drum is thus immobilized in the position corresponding to the alignment of the injector with the row of tips, the injector being able to be moved in the same way as in FIGS. 10 and 11 with guides and an actuating mechanism, the connection between the injector and the tip and releasing of the tip after injection can be performed as described above.

The advance of various elements 1' is performed in the embodiments of FIGS. 9 to 12 in the same way as for the embodiment of FIGS. 1 to 5 with a motorized driving drum 11, elements 1' being brought to rest against this drum 11 by press rollers 12.

According to characteristics not shown, each of the tubular elements can exhibit near its other longitudinal end an injection orifice made under the same conditions as described above. Since the first orifice must be accessible during placing of the structure, said "bottom" orifice makes it possible to perform a partial preliminary injection, for example 100 to 500 kg of cement, to stabilize temporarily the element which is put in place while waiting for it to be filled completely with cement after completion of the injection by the second orifice.

Further, regardless of the embodiment, the structure according to the invention can advantageously be provided with lateral weighting elements, such as lead ballast, installed along each edge of the structure, to stabilize temporarily the part of the structure laid on the floor before injection of the cement is achieved in the part of the structure concerned.

Although the invention has been described in connection with particular embodiments, it is quite evident that it is in no way limited and that numerous variants and modifications can be made without thereby going outside its framework or spirit.

Further, although the invention has been described in connection with a covering structure, the structure according to the invention and its placing device can be used as a foundation to support a pipe laid on the ocean floor at points where, because of the unevenness of the floor, the pipe does not rest on the floor. For this purpose, structure elements are unwound and inserted under the pipe in a direction oblique or perpendicular to the pipe and they are filled with hardenable material. The foundation thus made makes it possible to avoid the harmful effects of bending and vibration of the pipe.

I claim:

1. An apparatus for covering an elongated member lying on a seabed with a covering structure in the form of a flattened tubular element having a plurality of discrete longitudinally spaced injection orifices therein for receiving a hardenable material, and for filling the covering structure with hardenable material, the apparatus comprising
    a frame,
    means for moving the frame along the seabed,
    means on said frame for receiving said covering structure from a supply thereof, and for delivering said structure to the seabed,
    an injector nozzle movably supported on said frame, in a position facing said orifices,
    means for automatically connecting said injector nozzle to said orifices in sequence as the frame moves along the seabed, and
    means for delivering hardenable material from a source of said material to said injector nozzle.

2. The invention of claim 1, further comprising means for moving said injection nozzle axially towards one of said orifices.

3. The invention of claim 1, wherein the orifices are provided in respective plates mounted on the elements and the plates are interconnected by guide cables, said apparatus further comprising means for following said guide cables.

4. The invention of claim 3, further comprising means for sensing when the nozzle is opposite one of said orifice plates, and means responsive to said sensing means for stopping progress of said apparatus along said guide cables.

5. An apparatus for covering elongate members lying on a seabed
    with a covering structure comprising a series of closed flexible tubular elements, each having means for receiving an injection of hardenable material, said apparatus comprising
    a frame,
    means for moving the frame along the seabed,
    means on said frame for receiving said covering structure from a supply thereof, and for delivering said structure to the seabed,
    means for delivering hardenable material from a source of said material to said injection receiving means, and
    means for automatically connecting said delivering means to said injection receiving means in sequence as said frame moves along the seabed.

6. The invention of claim 5, wherein said injection receiving means comprises an injection orifice normally closed by a check valve.

7. The invention of claim 6, wherein each of said elements has a plate affixed thereto, and each of said injection orifices is formed in a respective one of said plates.

8. The invention of claim 6, wherein said delivering means comprises a nozzle in communication with said source of hardenable material, said nozzle being adapted to feed hardenable material into one of said orifices.

9. The invention of claim 8, further comprising means for moving said nozzle axially toward an orifice aligned therewith.

* * * * *